United States Patent
Matsumoto

(10) Patent No.: US 7,113,379 B2
(45) Date of Patent: Sep. 26, 2006

(54) DC-DC CONVERTER

(75) Inventor: Tadahiko Matsumoto, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 341 days.

(21) Appl. No.: 10/307,291

(22) Filed: Dec. 2, 2002

(65) Prior Publication Data

US 2003/0128485 A1 Jul. 10, 2003

(30) Foreign Application Priority Data

Dec. 3, 2001 (JP) ............................. 2001-368831

(51) Int. Cl.
*H02H 9/02* (2006.01)

(52) U.S. Cl. .......................................... 361/57; 361/20

(58) Field of Classification Search ................... 361/18, 361/20, 87; 307/51, 52, 82, 85; 363/65
See application file for complete search history.

(56) References Cited

U.S. PATENT DOCUMENTS

| | | | |
|---|---|---|---|
| 4,447,841 A | 5/1984 | Kent | |
| 4,584,514 A | 4/1986 | Kaminski | |
| 4,761,702 A * | 8/1988 | Pinard | 361/18 |
| 4,766,364 A * | 8/1988 | Biamonte et al. | 323/272 |
| 4,947,310 A * | 8/1990 | Kawabata et al. | 363/71 |
| 4,961,048 A * | 10/1990 | Banura | 323/351 |
| 5,012,401 A * | 4/1991 | Barlage | 363/97 |
| 5,495,209 A * | 2/1996 | Gerstenberg | 332/108 |
| 5,499,154 A | 3/1996 | Cullison | |
| 5,521,809 A * | 5/1996 | Ashley et al. | 363/71 |
| 5,818,670 A | 10/1998 | Ahn | |
| 5,986,902 A * | 11/1999 | Brkovic et al. | 363/50 |
| 5,999,421 A | 12/1999 | Liu | |
| 6,094,362 A | 7/2000 | Domingo | |

FOREIGN PATENT DOCUMENTS

| | | |
|---|---|---|
| GB | 2 191 050 A | 12/1987 |
| JP | 03-117381 | 12/1991 |
| JP | 04-017520 | 1/1992 |
| JP | 04-021357 | 1/1992 |
| JP | 2000-324817 | 11/2000 |

OTHER PUBLICATIONS

L5991 Primary Controller with Stanby, Data Sheet, Aug. 2001, STMicroelectronics, pp. 1-20.*
Official Communication dated Nov. 29, 2005, issued in the corresponding German Patent Application No. 102 55 110.3-32 (with full English translation).

* cited by examiner

*Primary Examiner*—Stephen W. Jackson
*Assistant Examiner*—Zeev Kitov
(74) *Attorney, Agent, or Firm*—Keating & Bennett, LLP

(57) ABSTRACT

A switching power supply unit includes an overcurrent protection circuit section and a latch-stop release signal output circuit section. The overcurrent protection circuit section performs an overcurrent protection operation for latching and stopping the switching operation of a main switch during an overcurrent state. The latch-stop release signal output circuit section outputs a signal, only in a predetermined latch-stop release period, for releasing the latch stop after a certain waiting time has elapsed from the time of the latch stop. This arrangement can virtually perform a hiccup-mode overcurrent protection operation at the time of overcurrent, and expands the scope of application of a switching power supply unit. Switching power supply circuits are interconnected by simultaneous starting connections. Switching controllers for the main switches are connected to match hiccup mode restart timings.

8 Claims, 5 Drawing Sheets

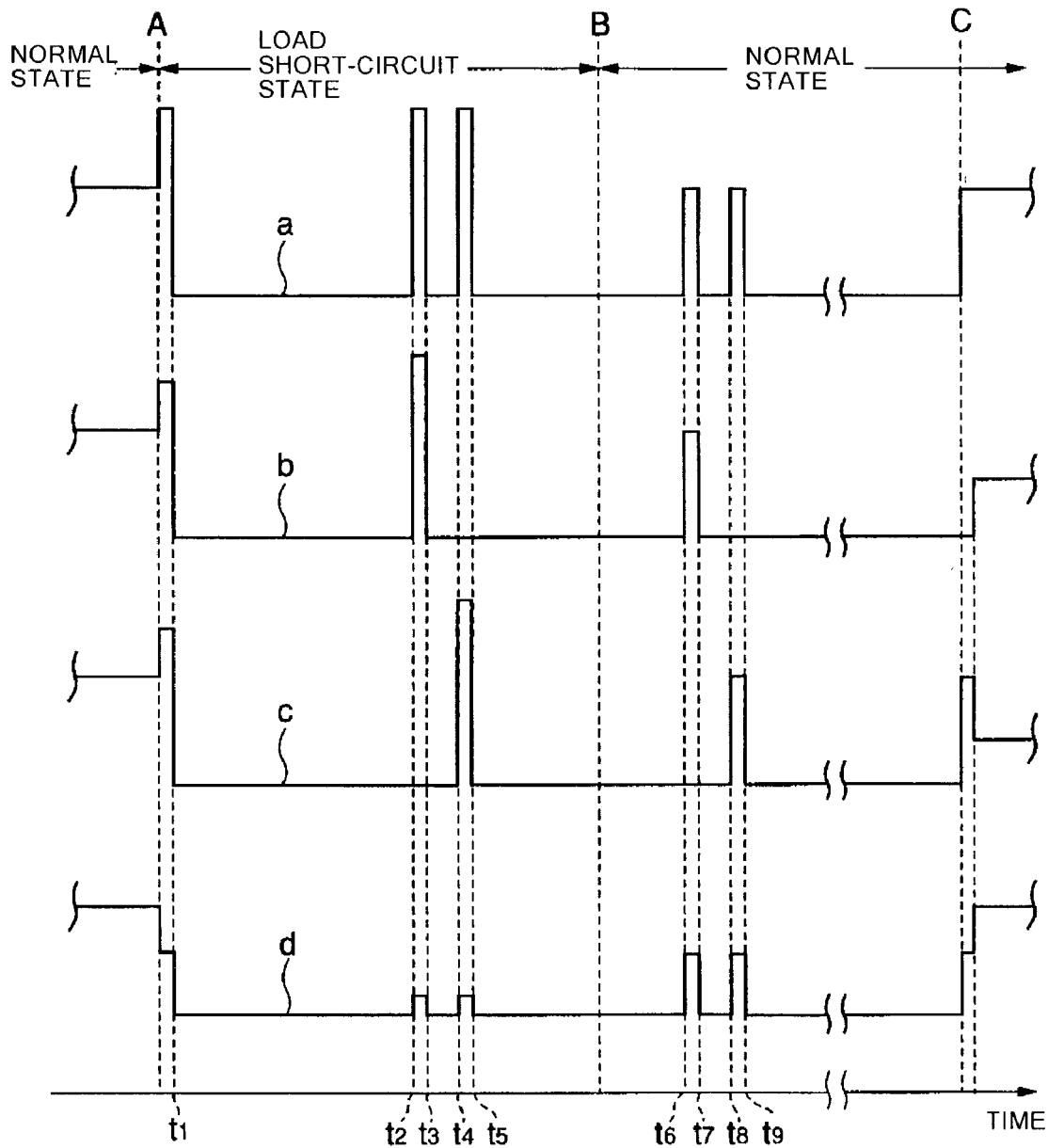

DC-DC CONVERTER

BACKGROUND OF THE INVENTION

1. Field of the Invention

The present invention relates to a switching power supply unit having a function of protecting against output overcurrent.

2. Description of the Related Art

Typically, switching power supply units include a circuit having an overcurrent protection function for preventing load circuit components from being broken, emitting smoke, or being ignited due to output overcurrent during short-circuiting of a load. The switching power supply circuits for performing overcurrent protection are provided with a device for detecting overcurrent. Various circuit systems are known for detecting overcurrent. Examples include a system in which a current detection element, such as a current transformer or resistor, is inserted in an output current path to directly detect the output current. For an insulated switching power supply circuit having a transformer, there is a system in which a current detection element, such as a current transformer or resistor, is inserted into a primary switching current loop and the peak value of AC current thereof is observed to indirectly detect the output current. For a switching power supply having a large output impedance, there is a simple system in which the overcurrent state is determined when the output voltage drops even though the output voltage is stabilized by the duty ratio control of a switching element.

Various systems are known for providing a protection operation upon detection of output overcurrent. Examples include a system in which an output voltage is caused to drop by reducing the duty ratio of a switching element (an output voltage drop mode), a system in which output overcurrent is detected to latch and stop the switching operation at a certain time after the overcurrent detection (a latch-stop mode), and a system in which the operation and the stopping of the switching operation is repeated cyclically upon detection of output overcurrent (a hiccup or intermittent mode). Also available is a system in which the output voltage drop mode and the latch-stop mode or the hiccup mode are combined. In this case, when overcurrent is detected, the output voltage is instantaneously caused to drop, and in this state, when the overcurrent continues for a certain period of time or more, an overcurrent protection operation is performed in the latch-stop mode or the hiccup mode.

In addition, for an insulated switching power supply circuit using a synchronous rectifier for rectifying the output current, there is a problem in that, when overcurrent protection is performed in an output voltage drop mode during load short-circuiting, the power supply for driving the synchronous rectifier cannot be secured, thereby heating the synchronous rectifier Thus, an overcurrent protection operation may he performed by combining an output voltage drop mode with another synchronous rectifier protection mode.

An appropriate system is selected from among the various overcurrent protection systems described above and adopted depending on, for example, the application of a switching power supply unit. For example, in an application in which it is preferred that the switching power supply continues to stop in the period of time from the detection of the output overcurrent to the reset of a switching power supply circuit, the overcurrent protection may be performed by combining the output voltage drop mode and the latch-stop mode. In an application in which it is desired that the output voltage automatically recover when a load short-circuit state is eliminated, the overcurrent protection is performed by combining the output voltage drop mode and the hiccup mode.

A known approach for increasing the output power applied to a load is a parallel operation in which the input/output terminals of a plurality of switching power supply circuits are connected in parallel. Due to load short circuiting the switching power supply circuits, which are operated in parallel, also require protection against output overcurrent. In this case, it is preferable that the overcurrent protection operation be performed in a hiccup mode in the application described above, in which it is desired that the output voltage recover when a load short-circuit state is eliminated.

FIG. 5 shows exemplary waveforms of output currents and output voltages of two switching power supply circuits, α and β, from when a load short-circuiting occurs to when the load short-circuiting is eliminated and the switching power supply circuits return to a normal condition. The switching power supply circuits α and β are operated in parallel and perform hiccup-mode overcurrent protection. In FIG. 5, waveform a is the total output current of the two switching power supply circuit α and β, waveform b is the output current of the switching power supply circuit α, waveform c is the output current of the switching power supply circuit β, and waveform d is the total output voltage of both switching power supply circuits α and β.

In hiccup mode, typically, the time (waiting time) from the stopping of the switching operation after the flow of overcurrent until the restarting of the switching operation is set by a time-constant circuit. The capacitance, C, and resistance, R, of the time-constant circuit may vary due to variations in the components constituting the time-constant circuit. Consequently, the waiting time from the stopping of the circuit operation due to overcurrent to the restarting thereof can vary for each switching power supply circuit.

Suppose, as shown in FIG. 5, load short-circuiting occurs at time A due to the variations in the waiting time, and this results in an overcurrent state. In this case, two switching power circuits α and β, stop at substantially the same time, $t_1$. Even though the switching power supply circuits are operated in parallel, one switching power supply circuit, α, may restart earlier than the other switching circuit, β, at time $t_2$. After restarting, the switching power supply circuit, α, detecting the continuation of the overcurrent sate, stops again at time $t_3$. Subsequently, the other switching power supply circuit, β, restarts at time $t_4$, and similarly, upon detecting the continuation of the overcurrent state, stops again at time $t_5$.

Suppose the load short-circuiting is eliminated at time B. In the same manner as described above, when one switching power supply circuit α restarts earlier than the other switching power supply circuit β at time $t_6$, due to the variations of the waiting time, the switching power supply circuit α outputs a current corresponding to the current output by the two switching power supply circuits α and β which are operated in parallel. As a result, the switching power supply circuit α incorrectly determines that the output overcurrent state is still occurring, and stops again at time $t_7$. Thereafter, the other switching power supply circuit β which has started, for example, at time $t_8$ stops again for the same reason at time $t_9$. Such a phenomenon continues until the restart timings of the two switching power supply circuits α and β, which are operated in parallel, happen to come closer and they restart at substantially the same time (timing C in FIG. 5).

In this manner, the deviation of the restart timings due to the difference between waiting times of the switching power supply circuits α and β, which are operated in parallel, causes a problem in that the switching power supply circuits α and β cannot return to a normal operation immediately even after load short-circuiting is eliminated.

In addition, when the output voltage returns at timing C but the restart timings of the switching power supply circuits α and β, which are operated in parallel, are somewhat deviated, for example, only the switching power supply circuit β that has restarted earlier starts in an overcurrent drop state. As a result, when the switching power supply circuits α and β return to a normal state, the waveform of the total output voltage thereof becomes a step-up and step-down form (refer to waveform d in FIG. 5). This causes a problem in that any electronic device that is connected as the load may malfunction.

Additionally, an appropriate operation mode for overcurrent protection varies depending on the application, as described above. For example, a latch-stop mode is suitable for an application in which it is preferred that a switching power supply circuit continue to stop in the period from the detection of an output overcurrent to the reset of the switching power supply circuit. A hiccup mode is suitable for an application in which it is desired that the output voltage automatically recover when a load short-circuit state is eliminated. Consequently, there is a problem in that switching power supply circuits designed for a latch-stop mode cannot be used in an application in which a hiccup mode is desired, i.e., in an application in which it is desired that the output voltage automatically recover when a load short-circuit state is eliminated.

SUMMARY OF THE INVENTION

In order to overcome the problems described above, preferred embodiments of the present invention provide a switching power supply unit that includes a plurality of switching power supply circuits operated in parallel and that can immediately return to a normal state after a load short-circuit state is eliminated during a hiccup-mode overcurrent protection operation. In addition, preferred embodiments of the present invention provide a switching power supply unit that is capable of changing, as required, a switching power supply circuit having a circuit configuration for performing a latch-stop overcurrent protection operation after a set time (mask time) has elapsed from the detection of overcurrent to a switching power supply circuit for virtually performing a hiccup-mode overcurrent protection operation.

According to a preferred embodiment of the present invention, a switching power supply unit includes a plurality of switching power supply circuits that are connected in parallel with each other. The total output of the switching power supply circuits is supplied to a load. Each switching power supply circuit includes an overcurrent detection circuit section for directly or indirectly detecting an overcurrent state of the current that is output to the load, and an overcurrent protection circuit section for performing a hiccup-mode overcurrent protection operation in which the circuit operation is cyclically stopped and restarted upon the detection of an overcurrent state. The switching power supply unit further includes a device for matching hiccup-mode restart timings of the switching power supply circuits when each switching power supply circuit performs the hiccup-mode overcurrent protection operation using the corresponding overcurrent protection circuit section.

According to this preferred embodiment of the present invention, it is possible to prevent problems caused by mismatching of the restart timings since the hiccup mode restart timings can be matched. Thus, the present preferred embodiment of the present invention offers an advantage of solving a problem in that, variations in C and R components of a time constant circuit, which determines time from the stopping of the switching operation due to overcurrent to the restarting thereof cause variations in time from the stopping of the operation to the restarting thereof for each switching power supply circuit. This displaces the restart timings, and each power supply circuit cannot immediately return to a normal state after load short circuiting is eliminated (i.e., after an overcurrent state is eliminated). Further, the present preferred embodiment of the present invention offers the advantage of solving a problem in that a load malfunctions since the mismatched restart timings cause the voltage waveform to become a step-up and step-down form when the circuit returns to a normal state.

Preferably, each switching power supply circuit includes a switching controller for controlling the stopping and the starting of the circuit operation and the overcurrent protection circuit section controls the switching controller to perform the hiccup-mode overcurrent protection operation. Preferably, each switching power supply circuit further includes a simultaneous starting connection that is connected to the corresponding switching controller. The simultaneous starting connections of the switching power supply circuits are interconnected directly or indirectly, so that the switching controllers of the switching power supply circuits are interconnected to match the restart timings of the hiccup mode caused by the overcurrent protection circuit sections. With this arrangement, it is possible to match hiccup mode restart timings using a simple circuit configuration and to prevent the circuit configuration from becoming complicated.

Preferably, the switching power supply circuits are interconnected via the simultaneous starting connections to cause each switching power supply circuit to simultaneously return to a normal state after an overcurrent state is eliminated.

According to another preferred embodiment of the present invention, a switching power supply unit which supplies power to a load includes an overcurrent detection circuit section for directly or indirectly detecting an overcurrent state of current that is output to the load, and an overcurrent protection circuit section for performing a latch-stop-mode overcurrent protection operation in which the circuit operation is latched and stopped after a predetermined time has elapsed from the detection of an overcurrent state. The switching power supply unit further includes a latch-stop release signal output circuit section for outputting a signal, only in a predetermined latch-stop release period, for releasing the latch stop after a set waiting time has elapsed from the latch stop caused by the overcurrent protection circuit section. The latch-stop release signal output circuit section is provided internally or externally and virtually performs a hiccup-mode overcurrent protection operation. With this arrangement, it is possible to adapt a single power supply circuit to any one of a latch-stop mode and a hiccup mode by adding a simple circuit. This provides an advantage in that the scope of the application of the switching power supply circuit can be expanded.

The switching power supply unit may further include a plurality of switching power supply circuits which are connected in parallel with each other. In this case, each switching power supply circuit includes an overcurrent detection circuit section and a latch-stop-mode overcurrent protection circuit section. The total output of the switching power supply circuit is supplied to the load, and the latch-stop release signal output circuit sections are commonly connected to the switching power supply circuits. Each switching power supply circuit virtually performs a hiccup-mode overcurrent protection operation. The switching power supply unit may further include a device for matching hiccup mode restart timings of the switching power supply circuits. This arrangement can provide the same advantages as the above-described preferred embodiment of the present invention.

According to a further preferred embodiment of the present invention, a switching power supply unit for supplying power to a load includes an overcurrent detection circuit section for directly or indirectly detecting an overcurrent state of current that is output to the load, a latch-stop-mode overcurrent protection circuit section for performing a latch-stop-mode overcurrent protection operation in which the circuit operation is latched and stopped upon the detection of an overcurrent state, and a hiccup-mode overcurrent protection circuit section for performing a hiccup-mode overcurrent protection operation in which the circuit operation is cyclically stopped and restarted upon the detection of an overcurrent state. The switching power supply unit further includes an overcurrent-protection-mode selection device for selectively putting only one of the latch-stop-mode overcurrent protection circuit section and the hiccup-mode overcurrent protection circuit section into a state in which driving is possible. With this arrangement, it is possible to adapt a single switching power supply circuit to any one of a latch stop mode and a hiccup mode and to expand the scope of application of the switching power supply circuit.

The switching power supply unit may further include a plurality of switching power supply circuits that are connected in parallel with each other. In this case, each switching power supply circuit preferably includes the overcurrent detection circuit section and the latch-stop-mode overcurrent protection circuit section. The total output of the switching power supply circuits is supplied to the load. The switching power supply unit may further include a device for matching hiccup-mode restart timings of the switching power supply circuits when the hiccup-mode overcurrent protection circuit section is selected.

Other features, elements, characteristics and advantages of the present invention will become more apparent from the following detailed description of preferred embodiments thereof with reference to the attached drawings.

BRIEF DESCRIPTION OF THE DRAWINGS

FIG. 5 is a graph illustrating conventional problems.

DETAILED DESCRIPTION OF PREFERRED EMBODIMENTS

Preferred embodiments according to the present invention will now be described with reference to the accompanying drawings.

Figure 1:
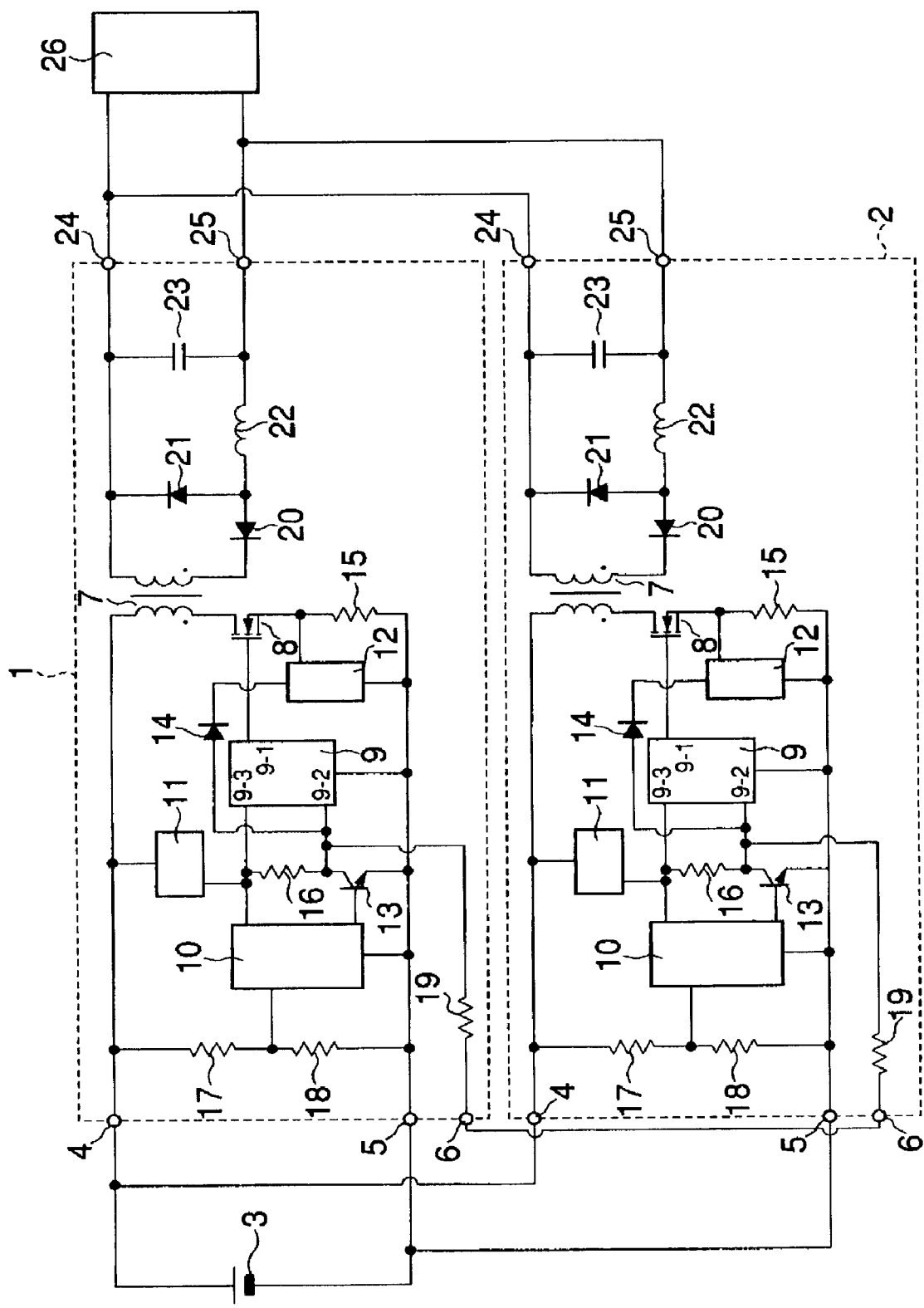
FIG. 1 is a schematic circuit diagram showing a switching power supply unit according to a first preferred embodiment of the present invention.

FIG. 1 shows the circuit configuration of a switching power supply unit of a first preferred embodiment of the present invention. The first preferred embodiment corresponds to a first aspect of the present invention. In FIG. 1, reference numeral 1 indicates a switching power supply circuit, 2 is another switching power supply circuit, 3 is a DC input power supply, 4 is a positive input terminal, 5 is a negative input terminal, 6 is a simultaneous starting terminal that serves as a connection for simultaneous startup, 7 is a transformer, 8 is a main switch, and 9 is a PWM control IC that functions as a switching controller for the main switch 8. Reference numeral 9-1 in the PWM control IC 9 is a gate driving terminal for the main switch 8, 9-2 is an ON/OFF control terminal, and 9-3 is a terminal for receiving the supply of a control circuit drive voltage Vcc. Reference numeral 10 is an input voltage monitor circuit block; 11 is a regulator circuit block; 12 is an overcurrent-protection/hiccup-operation circuit block that functions as a hiccup-mode overcurrent protection circuit section; 13 is an NPN transistor; 14, 20, and 21 are diodes; 15 is a current detection resistor; 16, 17, 18, and 19 are resistors; 22 is a choke coil; 23 is a capacitor; 24 is a positive output terminal; 25 is a negative output terminal; and 26 is a load.

In the first preferred embodiment, the switching power supply circuits 1 and 2 are insulated DC-DC (DC-input DC-output) converters, which are connected in parallel with each other and are operated in parallel for increasing the power to be supplied to the load 26.

The PWM control IC 9 of each of the switching power supply circuits 1 and 2 has a configuration in which the switching operation of the main switch 8 is controlled by pulse width modulation to stabilize the output voltage. The PWM control IC 9 performs the switching operation of the main switch 8 when the voltage level of the ON/OFF control terminal 9-2 becomes High, and stops the switching operation of the main switch 8 when the voltage level becomes Low.

Each input voltage monitor circuit block 10 is configured to stop the switching operation of the main switch 8 when a voltage input from the DC input power supply 3 decreases to a certain value or less.

Each regulator circuit block 11 supplies a regulated voltage Vcc to the terminal 9-3 of the PWM control IC 9.

Each current detection resistor 15 constitutes an overcurrent detection circuit section for indirectly detecting the overcurrent state of current output to the load 26. When the peak value of an AC voltage generated across the current detection resistor 15 becomes a specified value or more, it can be determined to be an overcurrent state.

Upon detection of an overcurrent in accordance with the voltage generated across the current detection resistor 15, the overcurrent-protection/hiccup operation circuit block 12 instantaneously causes the output voltage to drop. Further, when the overcurrent state continues for a certain period of time or more, the overcurrent-protection/hiccup-operation circuit block 12 performs a hiccup-mode overcurrent protection operation in which the ON and OFF of the switching operation of the main switch 8 (stopping and restarting of the circuit operation) are cyclically repeated.

For example, the overcurrent-protection/hiccup-operation circuit block 12 has an internal oscillator circuit, such as a multivibrator, and cyclically turns on and off the diode 14 in accordance with a signal output from the oscillator circuit. In the first preferred embodiment, when the diode 14 is turned on, the voltage level of the ON/OFF control terminal 9-2 becomes Low, so that the switching control operation of the PWM control IC 9 causes the switching operation of the main switch 8 to stop. When the diode 14 is turned off, the voltage level of the ON/OFF control terminal 9-2 becomes High, so that the switching control operation of the PWM control IC 9 causes the switching operation of the main switch 8 to start, thereby restarting the circuit operation. The repetition of this operation achieves the hiccup-mode overcurrent protection operation.

When a switching power supply unit having such a configuration is put into an overcurrent state due to short-circuiting of the load 26 for some reason, the peak value of the AC voltage generated across the current detection resistor 15 of each of the switching power supply circuits 1 and 2 becomes a specified value or more, and then the overcurrent protection/hiccup-operation circuit block 12 instantaneously causes the output voltage to drop. Further, when the overcurrent state continues for a certain period of time or more, the overcurrent-protection/hiccup-operation circuit block 12 causes the hiccup-mode overcurrent protection operation to start.

The overcurrent-protection/hiccup-operation circuit block 12 in each of the switching power supply circuits 1 and 2 uses a built-in time-constant circuit to set the time from the stopping of the switching operation of the main switch 8 to the restarting thereof, i.e., the period in which the diode 14 is ON. Due to the variations in the C and R components of each time-constant circuit, the period in which the diode 14 is ON can vary between the switching power supply circuits 1 and 2. Even in such a case, the simultaneous starting terminals 6 of the switching power supply circuits 1 and 2 are interconnected so that the ON/OFF control terminals 9-2 of the PWM control ICs 9 are connected with each other, and thus the first preferred embodiment can match the restart timings of the hiccup mode of the switching power supply circuits 1 and 2.

For example, suppose, after the diode 14 is turned on due to the hiccup-mode overcurrent protection operation to stop the main switch 8, the ON period of the diode 14 in the switching power supply circuit 1 is shorter than that in the switching power supply circuit 2 and the diode 14 in the switching power supply circuit 1 is turned off earlier to restart the main switch 8. Even in this case, since the simultaneous starting terminals 6 of the switching power supply circuits 1 and 2 are interconnected, when the diode 14 in the switching power supply circuit 2 is ON, current flows through the resistors 19 and the simultaneous starting terminals 6 of the switching power supply circuits 1 and 2, and thus, the ON/OFF control terminal 9-2 in the switching power supply circuit 1 is maintained at a Low level. Consequently, the main switch 8 in the switching power supply circuit 1 is not restarted.

This operation causes the restarting of the switching power supply circuit 1 to wait until the timing at which the diode 14 in the switching power supply circuit 2 is turned off and the switching power supply circuit 2 is restarted. As a result, the restart timings of both the switching power supply circuits 1 and 2 are matched.

Figure 2:
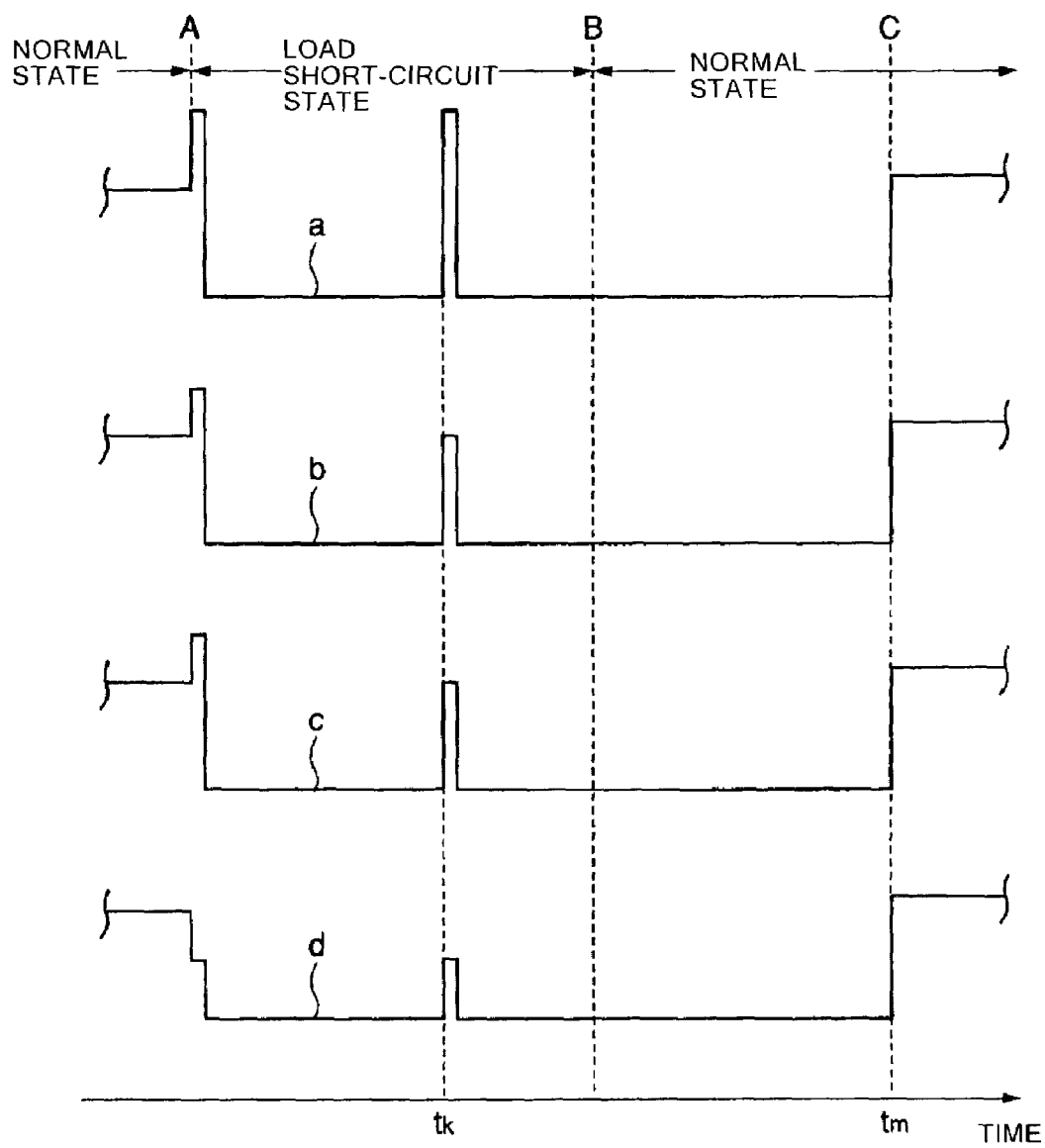
FIG. 2 is a graph showing exemplary waveforms of output currents and output voltages of the switching power supply unit according to preferred embodiments of the present invention.

FIG. 2 shows exemplary waveforms of output voltages and output currents when load short-circuiting occurs in the circuit of the first preferred embodiment. In FIG. 2, waveform a is the total output current of the switching power supply circuits 1 and 2, waveform b is the output current of the switching power supply circuit 1, waveform c is the output current of the switching power supply circuit 2, and waveform d is the total output voltage of the switching power supply circuits 1 and 2.

As shown in the exemplary waveforms, in the first preferred embodiment, the restart timings of the switching power supply circuits 1 and 2 during a hiccup-mode overcurrent protection operation substantially agree with each other (refer to "time $tk_k$" in FIG. ). Similarly, even after the load short-circuiting (overcurrent state) is eliminated (after timing B), the switching power supply circuits 1 and 2 restart at substantially the same time (refer to "time $t_m$"). As a result, the phenomenon as described above in which a switching power supply circuit that has started earlier outputs a current corresponding to a current output by two switching power supply circuits even after an overcurrent state is eliminated and then the switching power supply circuit incorrectly determines that the output overcurrent state still continues to occur and thus stops again, is not generated. Thus, this arrangement can return to a normal operation immediately after load short-circuiting is eliminated.

In addition, since the restart timings are substantially matched, the switching power supply circuits 1 and 2 return to a normal state simultaneously after an overcurrent state is eliminated and the phenomenon in which the voltage waveform becomes a step-up and step-down form after the switching power supply circuits 1 and 2 are put into a normal state is not generated. Thus, when an electronic device is connected as the load 26, the risk of the electronic device malfunctioning is avoided by this arrangement.

A second preferred embodiment of the present invention will now be described.

Figure 3:
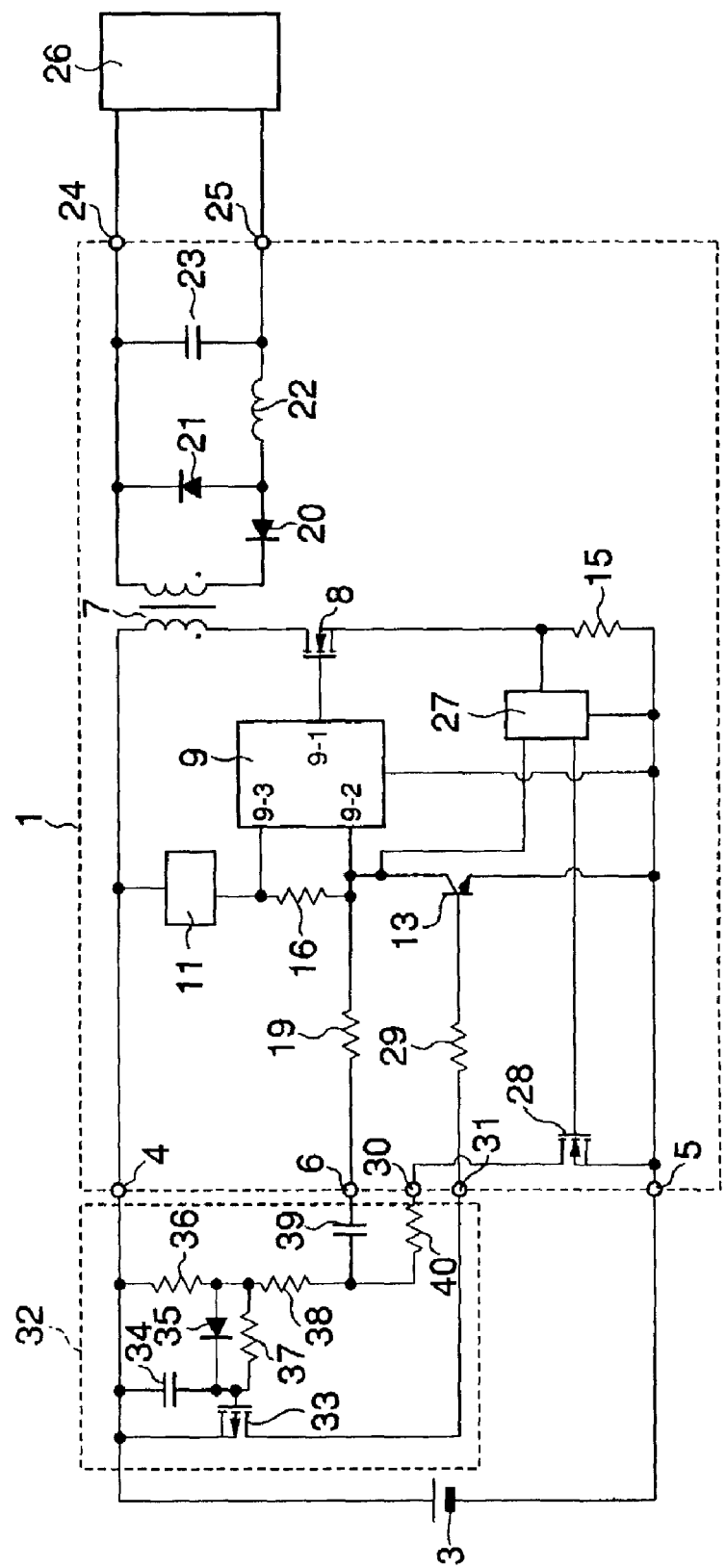
FIG. 3 is a schematic circuit diagram showing a switching power supply circuit according to a second preferred embodiment of the present invention.

FIG. 3 shows the circuit configuration of a switching power supply unit of a second preferred embodiment. In FIG. 3, reference numeral 1 indicates a switching power supply circuit, 3 is a DC input power supply, 4 is a positive input terminal 4, 5 is a negative input terminal, 6 is a simultaneous starting terminal which serves as a connection for simultaneous start up, 7 is a transformer, 8 is a main switch, and 9 is a PWM control IC which serves as a switching controller for the main switch 8. Reference numeral 9-1 in the PWM control IC 9 is a gate driving terminal for the main switch 8, 9-2 is an ON/OFF control terminal, and 9-3 is a terminal for receiving the supply of a control circuit drive voltage Vcc. Reference numeral 11 is a regulator circuit block; 13 is an NPN transistor; 15 is a current detection resistor; 16, 19, 29, 36, 37, 38, and 40 are resistors; 20, 21, and 35 are diodes; 22 is a choke coil; 23, 34, and 39 are capacitors; 24 is a positive output terminal; 25 is a negative output terminal; and 26 is a load. Further, reference numeral 27 is an overcurrent-protection/latch-stop-operation circuit block that functions as a latch-stop-mode overcurrent protection circuit section, 28 is an N-channel MOSFET, 30 is a latch stop indication terminal, 31 is a remote terminal, 32 is a latch-stop-mode/hiccup-mode conversion circuit block which is provided outside the switching power supply circuit 1 and which serves as a latch-stop release signal output circuit section, and 33 is a P-channel MOSFET.

In the second preferred embodiment, the switching power supply circuit 1 is an internal circuit of a switching power module (an insulated DC-DC converter), and the latch-stop-mode/hiccup-mode conversion circuit block 32 is an external circuit and thus is provided outside the switching power supply circuit 1.

The PWM control IC 9 of the switching power supply circuit 1 has a configuration in which the switching operation of the main switch 8 is controlled by pulse width modulation to regulate the output voltage. The PWM control IC 9 performs the switching operation of the main switch 8 when the voltage level of the ON/OFF control terminal 9-2 becomes High, and stops the switching operation of the main switch 8 when the voltage level becomes Low.

The regulator circuit block 11 supplies a regulated voltage Vcc to the PWM control IC 9.

The current detection resistor 15 constitutes an overcurrent detection circuit section for indirectly detecting the overcurrent state of current output to the load 26. When the peak value of an AC voltage generated across the current detection resistor 15 becomes a specified value or more, it can be determined to be an overcurrent state.

Upon detection of an overcurrent state in accordance with the voltage generated across the current detection resistor 15, the overcurrent-protection/latch-stop-operation circuit block 27 instantaneously causes the output voltage to drop. When the overcurrent state continues for a certain period of time or more, the overcurrent-protection/latch-stop-operation circuit block 27 latches and stops the switching operation of the main switch 8 and applies a voltage to the gate of the N-channel MOSFET 28 to turn it on.

In the second preferred embodiment, when the main switch 8 is in a latch-stop state, the overcurrent-protection/latch-stop-operation circuit block 27 turns on the N-channel MOSFET 28, and during the normal operation, the overcurrent-protection/latch-stop-operation circuit block 27 turns off the N-channel MOSFET 28. The latch stop indication terminal 30 outputs a signal for indicating the presence/absence of the latch stop to the outside of the switching power supply circuit 1, in accordance with the ON/OFF operation of the N channel MOSFET 28.

The remote terminal 31 is a terminal for inputting a signal for externally controlling the ON/OFF operation of the switching power supply circuit 1. In the second preferred embodiment, when the voltage level of the remote terminal 31 is set to High to turn on the NPN transistor 13, the voltage level in the ON/OFF control terminal 9-2 of the PWM control IC 9 becomes Low, so that the switching control operation of the PWM control IC 9 causes the switching operation of the main switch 8 to stop. In contrast, when the voltage level of the remote terminal 31 is set to Low to turn off the NPN transistor 13, the voltage level of the ON/OFF control terminal 9-2 of the PWM control IC 9 becomes High, so that the switching control operation of the PWM control IC 9 causes the switching operation of the main switch 8 to start.

After latching and stopping the main switch 8, the overcurrent-protection/latch-stop-operation circuit block 27 is reset to release the latch stop when the NPN transistor 13 is turned on.

In the switching power supply unit of the second preferred embodiment configured as described above, if only the internal circuit (the switching power supply circuit 1) is provided, the latch stop operation is performed at the time of overcurrent. However, the latch-stop-mode/hiccup-mode conversion circuit block 32, which is externally provided, virtually performs a hiccup-mode overcurrent protection operation at the time of overcurrent Thus, in the latch-stop-mode/hiccup-mode conversion circuit block 32, since the N-channel MOSFET 28 of the switching power supply circuit 1 is OFF in the normal operation, no current flows in a path passing through the resistors 36, 38, and 40 via the latch stop indication terminal 30, so that no voltage is generated between the gate and the source of the P-channel MOSFET 33. As a result, the P-channel MOSFET 33 remains OFF.

When the load 26 is short circuited for some reason during the operation of the switching power supply circuit 1 and thus is put into an overcurrent state, as described above, the peak value of the DC voltage generated across the current detection resistor 15 becomes a specified value or more, so that the overcurrent-protection/latch-stop-operation circuit block 27 instantaneously drops the output voltage. Further, when the overcurrent state continues for a certain period of time or more, a latch stop circuit portion in the overcurrent protection/latch-stop-operation circuit block 27 is driven so that the switching operation of the main switch 8 is turned into a non-operating state. At the same time, the overcurrent-protection/latch-stop-operation circuit block 27 turns on the N-channel MOSFET 28. Consequently, current is externally introduced through the latch stop indication terminal 30.

As a result, the current flows into a path passing through the resistors 36, 38, and 40 and a path passing through the capacitor 34 and the resistors 37, 38, and 40, so that the capacitor 34 is charged in accordance with the time constant relative to a series circuit constituted by the capacitor 34 and the resistors 37, 38, and 40. When a charged voltage across the capacitor 34 (i.e., the voltage between the gate and the source of the P-channel MOSFET 33) becomes the threshold value or more of the P-channel MOSFET 33, the P-channel MOSFET 33 is turned on. In response, current flows in the base of the NPN transistor 13 through the remote terminal 31 and the resistor 29 in the switching power supply 1, thereby turning on the NPN transistor 13.

As a result, current flows through the resistor 19 of the switching power supply circuit 1 and the capacitor 39 of the latch-stop-mode/hiccup-mode conversion circuit block 32, so that a positive feedback is performed in which the capacitor 34 is further charged. In general, such a positive feedback operation is required to configure an oscillator circuit.

Meanwhile, the overcurrent-protection/latch-stop-operation circuit block 27 is reset when the NPN transistor 13 is turned on. As a result, the latch stop is released to restart the main switch 8, and also the N-channel MOSFET 28 is turned off. In the second preferred embodiment, current that is supplied from the latch-stop mode/hiccup-mode conversion circuit block 32 to the base of the NPN transistor 13 through the remote terminal 31 and the resistor 29 of the switching power supply 1 acts as a signal for releasing the latch stop. The waiting time from when the latch stop is performed until when the signal for releasing the latch stop is output is the time from when the latch stop is performed until when a charged voltage across the capacitor 34 reaches the threshold value of the P-channel MOSFET 33. The time can be set in accordance with a time constant which is determined by the capacitor 34 and the resistors 37, 38, and 40.

As described above, when the overcurrent-protection/latch-stop-operation circuit block 27 turns off the N-channel MOSFET 28, the electric charge in the capacitor 34 is discharged through the resistor 37 and the diode 35 in accordance with a time constant based on the resistor 37 and the capacitor 34. As a result, when the charged voltage across the capacitor 34 (the voltage between the gate and the source of the P-channel MOSFET 33) falls below the threshold value of the P-channel MOSFET 33, the P-channel MOSFET 33 is turned off. Consequently, the current supply from the latch-stop mode/hiccup-mode conversion circuit block 32 to the NPN transistor 13 stops. Subsequently, upon detecting an overcurrent state again, the overcurrent-protection/latch-stop-operation circuit block 27 latches and stops the main switch 8. In the second preferred embodiment, the period of time in which the signal for releasing the latch stop is output, i.e., a latch stop release period, is determined based on the time the charged voltage across the capacitor 34 falls below a threshold value of the P-channel MOSFET 33 due to the discharge of the capacitor 34, and the period can be preset.

The diode 35 has a function of making the discharging time constant of the capacitor 34 smaller than the charging time constant thereof, which reduces the ratio of the ON period of the main switch 8 during a hiccup-mode overcurrent protection operation. This arrangement can prevent the generation of heat in components which is due to energization in an overcurrent state.

The repetition of the operation of the latch-stop-mode/hiccup-mode conversion circuit block 32, as described above, accomplishes the hiccup-mode overcurrent protection operation.

The present invention is not limited to the specific first and second preferred embodiments, and thus can take various forms. For example, in each preferred embodiment described above, the power conversion circuit system is a forward converter, but is not limited thereto. Thus, the power conversion circuit system can be applied to various systems, such as a flyback system, push-pull system, and half-bridge system.

The diodes 20 and 21 illustrated in each preferred embodiment may be rectifier diodes or a MOSFET synchronous rectifier.

In addition, in the first preferred embodiment, while two switching power supply circuits are operated in parallel, the number thereof is not limited to two and thus three or more switching power supply circuits may be used. When three or more switching power supply circuits are connected in parallel, in the same manner as the first preferred embodiment, for example, simultaneous starting terminals 6 which function as connections for simultaneous startup are provided, and the simultaneous starting terminals 6 of the switching power supply circuits are directly or indirectly connected. This can match the restart timings during the hiccup-mode overcurrent operations of the switching power supply circuits.

Figure 4:
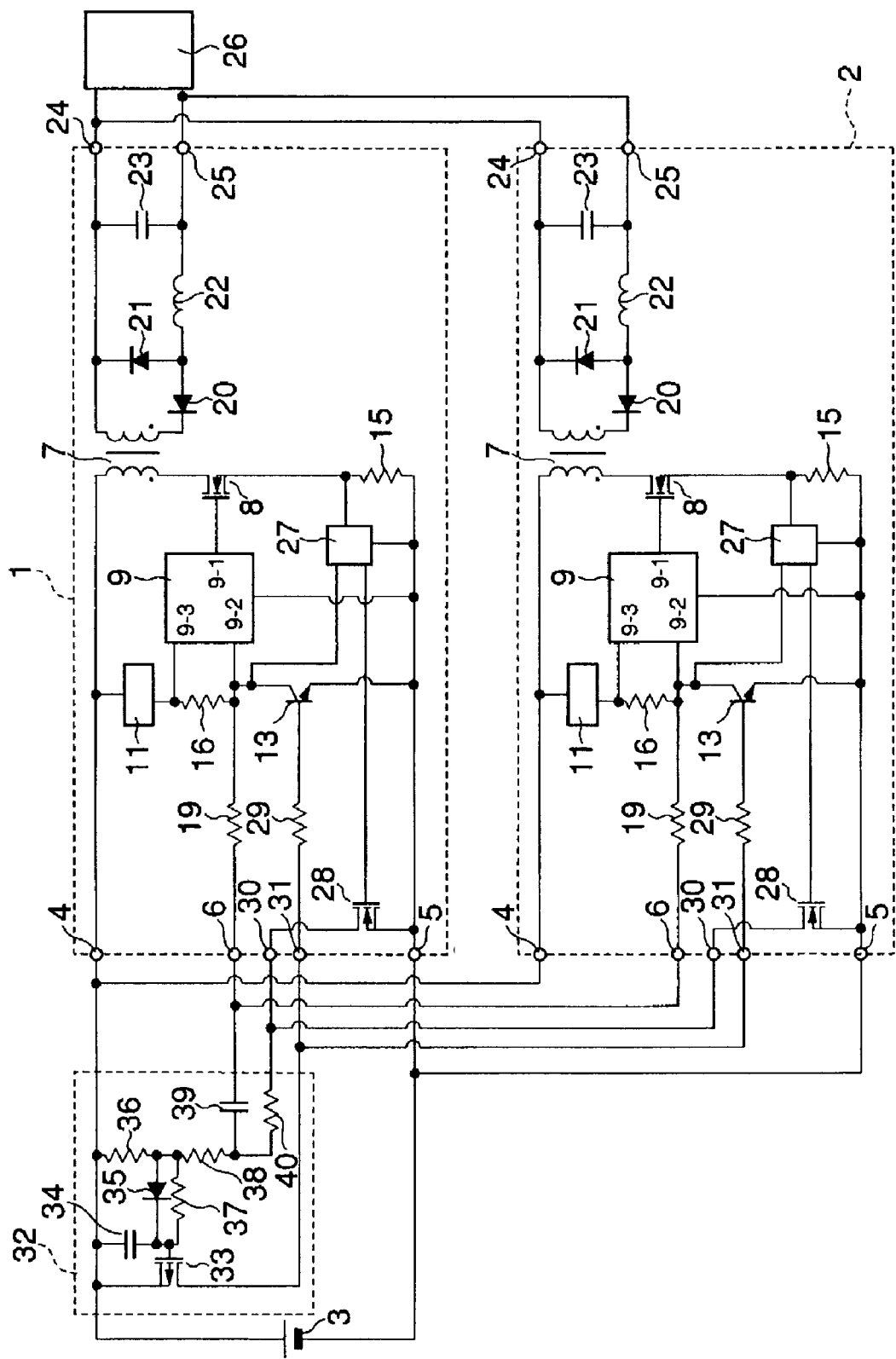
FIG. 4 is a circuit diagram illustrating another preferred embodiment of the present invention.

Additionally, the switching power supply circuit illustrated in the second preferred embodiment can also perform a parallel operation. In such a case, for example, a plurality of switching power supply circuits is connected in parallel, as shown in FIG. 4. That is, the positive input terminals 4, the negative input terminals 5, the positive output terminals 24, the negative output terminals 25, the latch stop indication terminals 30, and the remote terminals 31 of the switching power supply circuits are connected with each other. As shown in FIG. 4, the latch-stop-mode/hiccup-mode conversion circuit block 32 can be a common circuit for the plurality of switching power supply circuits that are operated in parallel.

In the same manner as the first preferred embodiment, providing simultaneous starting terminals 6 in the switching power supply circuits, which are operated in parallel, such that the simultaneous starting terminals 6 are connected to the corresponding ON/OFF control terminals 9-2 of the PWM control ICs 9 via the corresponding resistors 19 and interconnecting the simultaneous starting terminals 6 of the switching power supply circuits can match the restart timings during hiccup mode overcurrent protection operation.

In FIG. 4, while an example in which two switching power supply circuits are connected in parallel, three or more switching power supply circuits may naturally be connected in parallel.

Additionally, in the second preferred embodiment, while the latch-stop-mode/hiccup-mode conversion circuit block 32 is provided outside the switching power supply circuit 1, it may be provided inside the switching power supply circuit 1. In this case, the switching power supply circuit 1 will include a latch-stop-mode overcurrent protection circuit section, which is constituted by the overcurrent-protection/latch-stop-operation circuit block 27, and a hiccup-mode overcurrent protection circuit section, which is constituted by the overcurrent-protection/latch-stop operation circuit block 27 and the latch-stop-mode/hiccup-mode conversion circuit block 32. Thus, in this case, for example, a terminal is provided, as an overcurrent-protection-mode selection device, for externally inputting a signal for selectively putting only one of the latch-stop-mode overcurrent protection circuit section and the hiccup-mode overcurrent protection circuit section into a state in which driving is possible.

Additionally, a plurality of switching power supply circuits, each including such a latch-stop-mode overcurrent protection circuit section and a hiccup-mode overcurrent protection circuit section, may be connected in parallel with each other. Also in this case, in order for each switching power supply circuit to perform a hiccup-mode overcurrent protection operation, it is preferred that a device for matching the hiccup mode restart timings of the switching power supply circuits is provided.

Furthermore, in the first preferred embodiment, while the simultaneous starting terminals 6 of the switching power supply circuits are directly connected with each other, the simultaneous starting terminals 6 may be indirectly connected via a resistor.

In addition, in each preferred embodiment, while the switching power supply unit is configured to detect an overcurrent state indirectly, a current detection element, such as a current transformer or resistor, for directly detecting output current may be provided to detect an overcurrent state directly.

Additionally, in the first preferred embodiment, the switching power supply unit is configured such that, upon detection of an overcurrent state, it first drops the output voltage, and then, after a certain period has elapsed, it shifts its operation to a hiccup-mode overcurrent protection operation. Alternatively, the switching power supply unit may be configured such that, upon detection of an overcurrent state, it starts a hiccup-mode overcurrent protection operation immediately. Furthermore, in the second preferred embodiment, the switching power supply unit is configured such that, upon detection of an overcurrent state, it first drops the output voltage, and then, after a certain period has elapsed, it performs a latch-stop. Alternatively, the switching power supply unit may be configured to immediately perform a latch-stop upon detection of an overcurrent state.

In addition, in each preferred embodiment, while the device used for the power conversion is preferably an insulated DC-DC converter, it is not limited to an insulated DC-DC converter. For example, the present invention can also be applied to a non-insulated DC-DC converter or an AC input-DC output switching power supply circuit.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A DC-DC converter comprising:
   a plurality of switching power supply circuits that are connected in parallel with each other, a total output thereof being supplied to a load, wherein each of the switching power supply circuits includes an overcurrent detection circuit section for directly or indirectly detecting an overcurrent state of the current that is output to the load, and an overcurrent protection circuit section for performing a hiccup-mode overcurrent protection operation in which the circuit operation is cyclically stopped and restarted upon the detection of an overcurrent state; and
   a device that is arranged to match hiccup-mode restart timings of the switching power supply circuits when each of the switching power supply circuits performs the hiccup-mode overcurrent protection operation using the corresponding overcurrent protection circuit section; wherein
   each of the switching power supply circuits includes a switching controller for controlling the stopping and the starting of the circuit operation, and the overcurrent protection circuit section controls the switching controller to perform the hiccup-mode overcurrent protection operation, and wherein each of the switching power supply circuits includes a simultaneous starting connection that is connected to the corresponding switching controller, and the simultaneous starting connections of the switching power supply circuits are interconnected directly or indirectly, so that the switching controllers of the switching power supply circuits are interconnected to match the restart timings of the hiccup mode caused by the overcurrent protection circuit sections.

2. A DC-DC converter according to claim 1, wherein the switching power supply circuits are interconnected via the simultaneous starting connections to cause each switching power supply circuit to simultaneously return to a normal state after an overcurrent state is eliminated.

3. A DC-DC converter according to claim 1, wherein each of the switching power supply circuits includes an input voltage monitor circuit block and a regulator block.

4. A DC-DC converter according to claim 1, wherein each of the switching power supply circuits includes an NPN transistor, at least one diode, a current detection resistor, at least one resistor, a choke coil, a capacitor, a positive output terminal, and a negative output terminal.

5. A DC-DC converter according to claim 1, wherein each of the switching power supply circuits includes a PWM control integrated chip to control a switching operation of a main switch by pulse width modulation.

6. A DC-DC converter according to claim 1, wherein each of said overcurrent protection circuit sections includes an internal oscillator circuit.

7. A DC-DC converter according to claim 6, wherein said internal oscillator circuit is a multivibrator.

8. A DC-DC converter according to claim 1, wherein each of said overcurrent protection circuit section is defined by a latch-stop-mode overcurrent protection circuit section.

* * * * *